G. R. MEITZLER.
ELECTRICALLY HEATED SOLDERING IRON.
No. 11,364. Reissued Sept. 5, 1893.
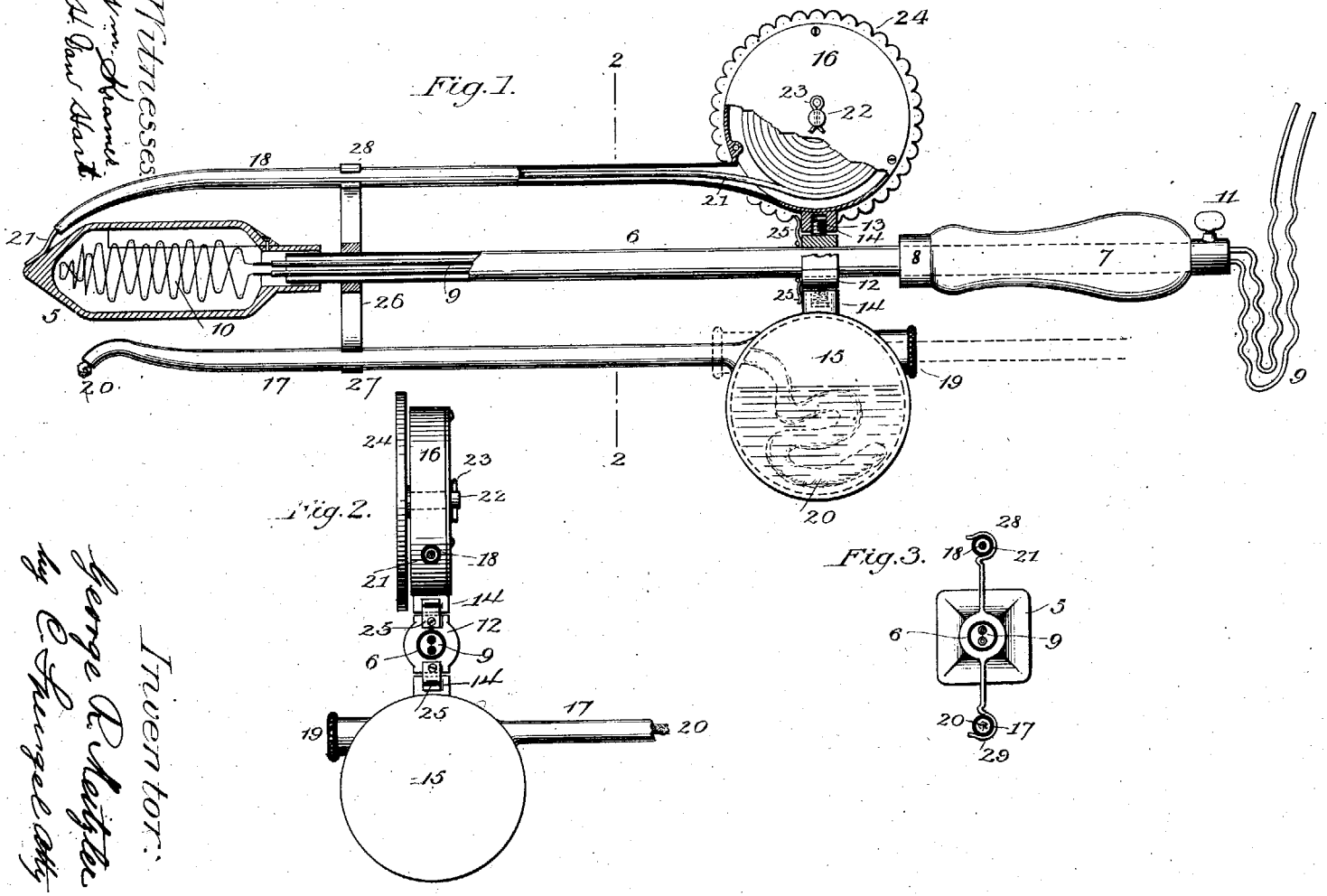
Witnesses:
Wm. Kramer
H. Paul Hart
Inventor:
George R. Meitzler
by C. Spengel Atty

UNITED STATES PATENT OFFICE.

GEORGE R. MEITZLER, OF CINCINNATI, OHIO, ASSIGNOR OF ONE-HALF TO WILLIAM H. OSBORNE, OF PRINCE'S BAY, NEW YORK.

ELECTRICALLY-HEATED SOLDERING-IRON.

SPECIFICATION forming part of Reissued Letters Patent No. 11,364, dated September 5, 1893.

Original No. 490,256, dated January 17, 1893. Application for reissue filed July 3, 1893. Serial No. 479,545.

*To all whom it may concern:*

Be it known that I, GEORGE R. MEITZLER, a citizen of the United States, residing at Cincinnati, in the county of Hamilton and State of Ohio, have invented a certain new and useful Electrically-Heated Soldering-Tool; and I do declare the following to be a full, clear, and exact description of the invention, such as will enable others skilled in the art to which it appertains to make and use the same, reference being had to the accompanying drawings, and to the figures of reference marked thereon, which form a part of this specification.

The object of this invention is to construct a soldering tool, of the kind which is heated interiorly, as for instance by electricity, with attachments for carrying soldering fluid and a supply of solder, the latter so arranged, that the solder may be supplied continuously as it is used. The construction of such a soldering tool is explained in the following description, pointed out in the claims and illustrated in the accompanying drawings, in which—

Figure 1, shows the tool in side-elevation, partly in section. Fig. 2, shows an end-view and section taken on a line 2—2 of Fig. 1, looking toward the handle and showing one of the attachments turned sidewise. Fig. 3, shows an end-view and section taken on the same line, but looking toward the point of the tool.

5, is the pointed head of the tool, which is made hollow and connected by a hollow shank 6, to a handle 7, also perforated in a longitudinal direction. The shank 6, is held on handle 7, by a ferrule 8, which latter with the handle are of a suitable non-conducting material.

9, is an electric conductor, which enters the tool preferably at the rear-end of its handle and after passing through it to the front-end, returns and preferably leaves the tool again at the same point where it entered. That part of the conductor 9, which occupies the hollow head 5, consists of several loops or coils 10, of fine wire and of higher electrical resistance than the rest of the conductor, which latter part may either traverse the tool in separate insulated conduits, or preferably consists of two branches of wire coated with insulating material. The conductor is connected with some suitable source whence the electric current is obtained and part of it near the handle of the tool consists preferably of soft wire of great pliability, to facilitate the quick and convenient manipulation of the tool.

11, is a suitable switch near the end of a handle, whereby the current may be permitted to pass through the tool, or turned off. Owing to their resistance, the coils 10, become hot when the current passes through them and on account of their closeness to head 5, they heat the latter.

For the purpose of supporting the soldering-fluid and solder-attachments, a ring 12, is provided and rigidly secured to shank 6. It has two short screw-threaded pins 13, onto which correspondingly screw-threaded sockets 14, of the attachments fit.

15, is the attachment carrying the soldering fluid, and 16, is the one for supplying the solder, both being circular flat cases containing the respective charges which are conveyed to the points where they are used near head 5, by snouts 17, and 18. Case 15, is charged with soldering fluid through an opening 19, which fluid is conveyed to the point of its consumption by a wick 20, which is saturated with it and fills snout 17, so snugly, as to prevent the fluid from flowing out too freely.

The solder with which case 16, is supplied comes in the form of a thin strip, as shown at 21, which form causes it to move freely from the case and also to melt easily. One of the sides of the case is removable for the purpose of admitting the introduction of the strip of solder, one end of which is secured to a central pin 22, which finds its bearing in the two sides of the case, the other end being started into the rear-end of snout 18. Both ends of pin 22, extend beyond the sides of the case, one end being provided with a spring-key 23, to prevent the pin from falling out, the other end carrying a disk 24, with a serrated edge, whereby pin 22, may be turned with one finger of the hand which holds the tool, whereby the solder is caused to unwind and to pass out through the open end of snout 18.

The manner of connecting the attachments to the tool as already described, permits the snouts of either of them of being turned aside and away from head 5, as illustrated in Fig. 2, in case they should be in the way on certain kinds of work.

For the purpose of holding the attachments in either position, flat springs 25, are provided and secured to ring 12, bearing with their free ends against one of the several flat surfaces on the outside of sockets 14. The pressure of these springs is sufficient to prevent the attachments from turning alone, but yields sufficiently when they are being turned from one position to another. In their normal positions, the two snouts are supported by a brace 26, secured near the front end of shank 6, and provided with two rests 27, and 28, which are somewhat elastic and fitting closely around the snouts, hold them in place by their spring pressure, but yield readily when they have to be turned sidewise. A portion of wick 20, extends out of snout 17, and is used to convey the soldering fluid onto the surfaces to be united by being passed over them. The end of snout 18, is a sufficient distance removed from head 5, to prevent the solder from melting within and before it has passed out.

In addition to the convenience and cleanliness attending the heating of the tool in this way and whereby the same is always ready for use, the manner of supplying the solder continuously to the heated point is a feature of great advantage inasmuch as it permits the soldering process to go on uninterruptedly and without any loss of time.

Having described my invention, I claim as new—

1. In combination with an interiorly heated soldering tool, an attachment to carry soldering fluid, adjustably connected with the tool, a snout for carrying a wick, connected to this attachment and means to hold the attachment in its adjusted positions, all as substantially shown and described.

2. An interiorly heated soldering tool having attachments to carry soldering fluid and solder connected to it, each one of the attachments having a snout to convey their respective charges to the point where they are used and a brace connected to the soldering tool and provided with rests to support the snouts, all as substantially shown and described.

3. In combination with an interiorly heated soldering tool, an attachment to supply solder to the point, consisting of a case which receives the solder which is in the shape of a strip or wire, a pin 22, mounted within the case and upon which the solder strip is wound, a disk 24, connecting to this pin and serving as a means to feed the solder forward, a snout to carry it to the heated point and means to connect the attachment adjustably to the shank of the tool, all as substantially shown and described.

In testimony whereof I affix my signature in presence of two witnesses.

GEORGE R. MEITZLER.

Witnesses:
C. SPENGEL,
WM. KRAMER.